Patented Feb. 19, 1946

2,395,327

UNITED STATES PATENT OFFICE 2,395,327

PROCESS FOR POLYMERIZING OLEFINIC MATERIALS

William E. Hanford, Wilmington, Del., assignor to E. I. du Pont de Nemours & Company, Wilmington, Del., a corporation of Delaware No Drawing. Application March 15, 1941, Serial No. 383,555

3 Claims. (Cl. 260—94)

This invention relates to polymerization processes and more particularly to polymerization processes involving ethylene, either alone or together with other polymerizable materials.

Various proposals have been made for the polymerization of ethylene to solid or semi-solid polymers such, for example, as in U. S. 2,153,553 and 2,188,465, wherein ethylene is subjected to elevated pressures and temperatures in the presence of polymerization-promoting catalysts.

Among the problems in the polymerization of ethylene, however, have been the undesired extent of the induction period before polymerization begins as well as the slowness of the reaction velocity, once the polymerization is under way. These factors or problems are of considerable importance in economical operation of the polymerization process, since a maximum space-time yield decreases the amount of equipment needed to produce a given amount of polymer. Furthermore, extended induction periods have adverse effects upon the final product, giving polymers of lower viscosity and in lower yields than in cases where the polymerization starts relatively quickly.

It is an object of this invention to provide a new and improved process for polymerization reactions involving ethylene.

It is another object of this invention to provide a method for lessening the induction period and, as well, for increasing the reaction velocity in polymerizations involving ethylene.

A further object of the invention is to provide an ethylene polymerizing process of relatively short induction period and relatively high reaction velocity.

Other objects and advantages of the invention will be apparent from the following specification.

According to this invention ethylene, alone or together with other polymerizable materials, may be polymerized in a manner which presents advantages over the prior art by carrying on the polymerization in the presence of water at elevated temperatures and pressures under controlled pH conditions, the pH being maintained in the approximate range of from 1 to 6, the pH preferably being from 2.0 to 4.0. The pH conditions under which the process of the present invention is carried out have a critical effect upon the induction period as well as upon the velocity with which polymerization occurs, and this situation obtains whether ethylene is polymerized alone or with polymerizable organic compounds. Generally, the more acid the medium the shorter the induction period and the more rapid the rate of reaction and conversely the lower the acidity of the medium the more sluggish the reaction in starting and the slower the rate at which it proceeds.

The final products resulting when effecting polymerization within the pH ranges of this invention are found to have higher viscosity and to be in higher yields than those products obtained at a pH outside the range of the present invention.

Although the invention will not be limited by the explanation, it would appear that the improvements effected by this invention may be due to maintenance of catalyst activity resulting in higher reaction velocity and the lower induction period, with consequent lower temperature and lower pressures permissible than in processes in which the pH is not controlled. Furthermore, where some dispersing agents are employed, long induction periods and slower reaction velocities tend to result in hydrolysis of such agents to compounds which disadvantageously affect the quality of the polymer. A high content of impurities in the product, due to prolonged contact of the catalyst with the metal walls of the reaction vessel, is avoided by the method of this invention which allows a shorter contact time. Whatever the explanation may be, however, actual operation has shown that the lessened induction periods and increased reaction velocity made possible by pH control, according to this invention, give products of higher viscosity and in greater yields than those obtained by processes previously proposed. This will be made clear by the examples, which have been so selected from an extended number as to show, by comparison, the critical nature of pH control according to this invention.

The range of temperature within which this invention may be practiced is wide, temperatures of from 20 to 350° C. covering the field of operation, preferably temperatures of 50 to 250° C. being used, although best results are obtained when the temperature is maintained in the more restricted range of from about 60 to 150° C. In polymerizing ethylene with other polymerizable materials, the particular temperatures used are affected by the polymerizing characteristics of the other components of the interpolymer and the particular catalyst used, but, as a rule, the preferred temperature ranges previously described may be employed advantageously.

Pressures in excess of 50 atmospheres and up to 3,000 atmospheres and above may be employed, although, preferably, pressures of 300 to 1500 atmospheres are commonly used. Actually, the upper pressure which may be employed is restricted primarily by the mechanical strength of commercially available equipment.

In practicing the invention, a suitable vessel is charged either with water or water together with an organic liquid, a catalyst favoring polymerization and, if desired, a surface active agent. The pH of the medium is then adjusted, the vessel closed, charged with ethylene to the desired pressure, agitation started, and the temperature adjusted to that at which it is desired to carry out the reaction. The pressure on the system is maintained by periodic additions of ethylene, and after the desired reaction has occurred the reaction vessel is opened, the polymer removed and thoroughly washed and dried.

The following examples will illustrate methods of practicing this invention and show, by comparison, the relative advantages of pH control according to the present invention when compared with instances wherein no such control was exercised. Parts are by weight unless otherwise stated.

*Example 1*

A silver-lined steel reaction vessel of 400 cc. capacity was charged with 160 parts of water, 40 parts of isooctane, 5.5 parts of a 45% paste of sodium pentadecane-8-sulfonate and 0.2 part of benzoyl peroxide. The pH of this charge was 6.54. The tube was then closed and placed in a shaker machine and suitable gas and heating connections made. The tube was then pressured to 570 atmospheres with ethylene and heating and agitation started. Throughout a reaction time of 6.25 hours the temperature was maintained at 94–95° C. and the pressure at 860–1000 atmospheres. After an induction period of 2.25 hours, reaction began and over the next four hours the total pressure drop observed was 180 atmospheres. The tube was then allowed to cool, bled of excess ethylene, opened, and the contents discharged. The pH of this reaction mixture was 4.70. The isooctane was separated by steam distillation and the solid polymer in the residue was filtered and washed thoroughly to completely remove the dispersing agent. The polymer was then pressed dry on the filter and finally dried in an oven at 70° C. There was obtained 7.4 parts of solid polyethylene having an intrinsic viscosity of 0.6 (0.25% in toluene at 85° C.).

It will be noted in Example 1 that the induction period was 2¼ hours and that a pressure drop of only 180 atmospheres was observed over the next four hours. This example may be taken as generally illustrative of operation without pH control.

*Example 2*

Example 1 was repeated, the pH being first adjusted to 3.8 by the addition of a few drops of dilute hydrochloric acid. The pH at end of the polymerization was 4.2. This run, carried out as in Example 1, except for the pH adjustment, had an induction period of less than 15 minutes and after reaction began, over the next three hours, the total pressure drop observed was 400 atmospheres.

In Example 2, when compared with Example 1, will be seen the great advantages in pH control. Thus, the induction period in Example 2 is less than 15 minutes (compared with 2¼ hours); the pressure drop in Example 2 was 400 atmospheres in three hours (compared with 180 atmospheres in four hours); and the yield was 16 parts of polymer in Example 2 (compared with 7.4).

*Example 3*

A silver lined steel reaction vessel was charged with 200 parts of water and 0.2 part of benzoyl peroxide, and the pH of the mixture adjusted from 5 to 2.4 by addition of dilute hydrochloric acid. The vessel was closed, ethylene added to a pressure of 575 atmospheres, agitated and the temperature raised to 99° C. at which temperature the pressure in the reaction vessel increased to 970 atmospheres. The induction period was less than 15 minutes.

During the first hour there was a total pressure drop of 180 atmospheres and during the following 9½ hours there was a 90 atmosphere additional pressure drop. Throughout the reaction the pressure was maintained between 870 and 980 atmospheres and the temperature between 99° and 110° C. At the end of this time the reaction vessel was opened, the reaction mixture filtered, the solid ethylene polymer washed thoroughly with hot water, then with methanol, and dried at 70° C. Twelve parts of polymer having an intrinsic viscosity (0.5% in xylene) of 0.90 which corresponds to a molecular weight of 16,420 was obtained. The melting point of the polymer was 118° to 120° C. Chips molded from the polymer were strong. Pressed films after cold rolling showed a tensile strength of 7,900 lbs./sq. in., based on the original dimensions.

*Example 4*

The pH of a mixture of 0.2 part of benzoyl peroxide in 200 parts of water was adjusted from 5.0 to 2.3 by addition of a few drops of dilute hydrochloric acid. The solution was charged into an aluminum lined steel reaction vessel, the vessel closed, pressured with ethylene, agitated, and reacted at 90° to 93° C. for 3 hours under 580 to 900 atmospheres pressure. There was no induction period, the reaction starting immediately. The product thus obtained was found to have an intrinsic viscosity (0.5% in xylene) of 0.95, which corresponds to a molecular weight of 20,200. The melting point of the polymer was 116° to 117° C.

*Example 5*

A silver lined steel reaction vessel was charged with 160 parts of water, 40 parts of isooctane, and 0.8 part of benzoyl peroxide. The pH of the mixture was adjusted from 5.0 to 2.1 by addition of dilute hydrochloric acid. The reaction vessel was closed, agitated, and pressured with ethylene so that at a reaction temperature of about 95° C. the pressure was 990 atmospheres. The induction period was less than thirty minutes. During a reaction period of 4 hours there was a total pressure drop of approximately 475 atmospheres. There was obtained 29 parts of polymer having a melting point of 117° to 118° C. and a melt viscosity at 139° C. of 2,700 poises.

*Example 6*

An emulsion of 1,1-dichloroethylene was prepared by mixing 180 parts of water, 20 parts of 1,1-dichloroethylene, 5 parts of a 50% aqueous solution of the sodium salt of sulfated 9,10-octadecenyl acetate, and 0.2 part of benzoyl peroxide. The pH of the mixture was adjusted to 2.8 by addition of dilute hydrochloric acid, and the mixture charged into a silver lined steel reaction vessel. The reaction vessel was closed, agitated, and pressured with ethylene so that at a reaction temperature of about 100° C. the pressure was about 900 atmospheres. There was about 15 minutes induction period. The reaction extended over about 11 hours, during which time the pressure was maintained at 810 to 960 atmospheres at a temperature of 95° to 101° C. by periodic additions of ethylene. During this time there was an observed pressure drop of 270 atmospheres. Thirty-three parts of a plastic material analyzing 36.8% chlorine were obtained. This corresponds to a dichloroethylene-ethylene mol ratio of 1 to 3.3.

*Example 7*

An aluminum lined steel reaction vessel is charged with 80 parts of water, 20 parts of methyl methacrylate, and 0.4 part of benzoyl peroxide. The pH of the mixture is adjusted to 3.3 by the addition of hydrochloric acid. The vessel is closed, placed in a shaker machine, pressured with ethylene, and heating and agitation started. In a reaction time of 10.25 hours, during which the temperature is maintained at 94 to 95° C. and the pressure at 870 to 980 atmospheres, the observed pressure drop totals 216 atmospheres. The tube is allowed to cool, bled of excess ethylene, opened, and the contents discharged. The pH of the mixture after completion of the reaction is 3.1. The reaction mixture is steam distilled to remove unreacted methyl methacrylate, the residue filtered, rinsed with methanol, and dried at 70° C. There is thus obtained 29 parts of a product which softens below 100° C. and which contains 70.2% carbon and 10.5% hydrogen, from which it may be calculated that the mole ratio of methyl methacrylate to ethylene is 1 to 2.5. The product has an intrinsic viscosity of 0.61 (measured as a 0.125% solution in xylene).

*Example 8*

A silver lined reaction vessel was charged with 10 parts of trichloroethylene, 190 parts of water, 4 parts of a 50% solution of the sodium salt of sulfated 9,10-octadecenyl acetate, and 0.6 parts of benzoyl peroxide. The pH of the mixture was adjusted from 5.2 to 2.9 by addition of dilute hydrochloric acid, the reaction vessel closed, heated to between 87° and 94° C., agitated, and pressured with ethylene to a pressure of between 850 and 950 atmospheres at this temperature. There was no apparent induction period. During a reaction period of 9 hours there was an observed total pressure drop of 705 atmospheres. At the end of the reaction the pH of the reaction mixture had dropped to 2.7. Unreacted trichloroethylene was removed by steam distillation, the solid residue repeatedly washed with water, then with methanol and finally dried at 70° C. There was obtained 37 parts of polymer melting at 95° to 97° C. and having an intrinsic viscosity (0.5% in xylene) of 0.198. The polymer contained 17.0% chlorine which corresponds to a mole ratio of trichloroethylene to ethylene of 1 to 17.5.

*Example 9*

An aluminum lined steel reaction vessel was charged with 175 parts of water and 0.4 part of benzoyl peroxide. The pH of the solution was adjusted from 4.1 to 2.1 by addition of dilute hydrochloric acid, the vessel closed, and 24 parts of propylene introduced. The reaction vessel was pressured with ethylene to a pressure of 600 atmospheres, agitated, and heated to 87° C. There was no apparent induction period. During a reaction time of 10 hours there was a total pressure drop of 260 atmospheres. Throughout this time the temperature was maintained at 87° to 88° C. and the pressure at 870 to 965 atmospheres by periodic additions of ethylene. The product obtained after washing and drying at 70° C. melted at 80° to 82° C. and had a melt viscosity at 139° C. of 21.5 poises. The yield was 13.7 parts.

*Example 10*

An aluminum lined steel reaction vessel was charged with 25 parts of isooctane, 150 parts of water, 2 parts of the sodium salt of sulfated 9,10-octadecenyl acetate, and 0.4 parts of benzoyl peroxide. The pH of the mixture was adjusted from 6.3 to 2.8 by addition of dilute hydrochloric acid, the vessel closed, and 25 parts of isobutylene introduced. The reaction vessel was pressured with 880 atmospheres of ethylene, agitated, and the temperature raised to 92° C. There was no induction period. During the next 10 hours there was an observed total pressure drop of 190 atmospheres; throughout this time the temperature was maintained at 89° to 92° C., and the pressure at 865 to 1000 atmospheres by periodic additions of ethylene. At the end of the reaction the mixture had a pH of 4.7. The yield was 6 parts of a product melting at 74° to 77° C., and having a melt viscosity at 139° C. of 3.8 poises.

*Example 11*

An aluminum lined steel reaction vessel was charged with 40 parts of acrylonitrile, 160 parts of water, 4 parts of the sodium salt of sulfated 9,10-octadecenyl acetate, and 0.2 part of benzoyl peroxide. The pH of the mixture was adjusted from 5.5 to 2.9 by addition of dilute hydrochloric acid. The reaction vessel was closed, pressured with ethylene to a pressure of 600 atmospheres, agitated, and heated to 78° C. There was approximately 15 minutes of induction period. During a 15 hour reaction period there was a total pressure drop of 460 atmospheres. Throughout this time the temperature was maintained at 76° to 81° C., and the pressure at 860 to 1075 atmospheres by periodic additions of ethylene. The pH of the mixture at the end of the reaction was 5.0. There was obtained 15 parts of a solid product which analyzed 68.4% carbon, 7.0% hydrogen, and 23.5% nitrogen. This corresponds to a mole ratio of acrylonitrile to ethylene of 4 to 1.

The above experiment was repeated using 10 parts instead of 40 parts of acrylonitrile and yielded a polymer analyzing 70.6% carbon, 7.3% hydrogen, and 20.3% nitrogen. This corresponds to approximately a mole ratio of acrylonitrile to ethylene of 2 to 1.

*Example 12*

An aluminum lined steel reaction vessel was charged with 20 parts of vinyl butyl ether, 180 parts of water, 2 parts of a 65% solution of the sodium salt of sulfated 9,10-octadecenyl acetate, and 0.4 part benzoyl peroxide. The pH of the mixture was adjusted from 4.9 to 2.6 by addition of dilute hydrochloric acid. The reaction vessel was closed, pressured with ethylene to 570 atmospheres, agitated, and heated to 96° C. Polymerization appeared to start at a temperature of about 85° C. with no induction period and during the next 3 hours there was a pressure drop of 510 atmospheres. During an additional 2 hours there was no further pressure drop. Throughout this time the temperature was maintained at 96° to 97° C., and the pressure at 830 to 950 atmospheres by periodic additions of ethylene. There was thus obtained 23.7 parts of a product melting at 97 to 99° C., and analyzing 83.6% carbon and 13.5% hydrogen.

Although in the examples hydrochloric acid has been used in adjusting the pH of the medium to the desired value, other acids such as sulfuric, phosphoric, formic, acetic, propionic, etc., may be used. Also, if desired, salts may be added to the reaction mixture to buffer the menstruum against pH change and to alter the solubility relationships of water and organic compounds.

The reaction is preferably carried out in water alone as the menstruum. If desired, however, a small amount of an organic compound and, preferably, a volatile organic liquid compound such as isooctane, toluene, butyl acetate, ethyl ether, n-hexane, cyclohexane, cyclohexanone, butanol, methanol, dioxane, etc., may be used in conjunction with water.

In practicing this invention it is generally preferred to use as small an amount of catalyst as possible for economic reasons. Generally it is not necessary to use more than 1% of catalyst, based on the total weight of the charge. The preferred catalytic materials are the organic peroxides such as benzoyl peroxide, diacetone peroxide, acetyl peroxide, succinyl peroxide, m-brombenzoyl peroxide, acetyl benzoyl peroxide, lauroyl peroxide, etc. These diacyl peroxides comprise the preferred class of catalysts for use in the practice of this invention. In some cases it is necessary to use a combination of the above catalysts.

In commercial practice a continuous process offers advantages of efficiency, more accurate control, and especially in the case of interpolymers better possibilities for adjusting the ratio of interpolymerizing ingredients. For most efficient operation in a continuous process a rapid rate of reaction is necessary. With many polymerizable mixtures of ethylene and other polymerizable organic compounds and especially with ethylene alone the most rapid polymerization is obtained when operating at a pH of from 2 to 4. When employing a persulfate catalyst, either a dispersing agent or another peroxide compound catalyst should be used for good results.

The essential conditions used in the continuous operation, technique of agitation, control of pH, isolation of finished products, and recirculation of unreacted materials, may be varied widely. For example, ethylene under pressure may be mixed continuously with water, a peroxide compound and, if desired, a surface active agent and the mixture, maintained in a turbulent state, passed under pressure through a reactor in which the time of contact and temperature are controlled, to effect the required degree of polymerization. The resulting suspension of polymer may then pass into an area of lower pressure to recover unreacted ethylene and the polymer isolated by filtration. When polymerizing ethylene with a liquid unsaturated compound the latter can be introduced continuously as a mixture with the water phase. When it is desired to polymerize continuously two unsaturated gases, both having critical temperatures below the operating temperature, e. g. ethylene and tetrafluoroethylene, the gases may be premixed in the desired proportions and brought into contact with the water phase under pressure or the gases may be injected separately into the water phase in the desired proportions.

For rapid polymerization it is necessary to provide intimate contact between all the reactants by agitation. By the term agitation as used herein it is intended to include any means for accomplishing intimate contact between the reactants, e. g. rapid stirring, turbulence in a continuous flow process, atomization, shaking, or efficient bubbling of the gas or gases through the liquid phase.

In practice it is desirable to use equipment fabricated of, or lined with, material which will not catalyze too rapidly the decomposition of peroxides to molecular oxygen. Examples of such lining materials are silver, aluminum, tin, glass, and stainless steels, e. g. steel containing 18% chromium and 8% nickel.

The term polymer as used in the claims refers to products obtainable by polymerizing ethylene alone or admixed with one or more of another polymerizable material having ethylenic unsaturation such as other monoolefins, e. g., propylene, butylene; dichloroethylene, 1,2-dichloroethylene, 2-chloropropene-1; tetrafluoroethylene; vinyl ethers, ketones, esters, and other vinyl compounds such as methyl and propyl vinyl ethers, methyl and ethyl vinyl ketones, vinyl chloroacetate, vinyl chloride, vinyl acetate, vinyl propionate, N-vinyl phthalimide, vinyl thiol acetate, methyl vinyl thioether, methyl vinyl sulfone, vinyl carbazole, vinyl sulfonic esters; styrene; stilbene; acrylic and methacrylic amides, nitriles, esters and other acrylic and methacrylic compounds, e. g., methylene diacrylate and dimethacrylate, ethyl, propyl, butyl and amyl acrylates and methacrylates; alpha-haloacrylic acids and esters, e. g., methyl alpha-chloroacrylate; esters of propionic and itaconic acids, e. g., methyl crotonate and diethyl itaconate; butadiene, isoprene, chloro-2-butadiene-1,3; terpenes, e. g., limonene and camphene.

By the process of this invention copolymers can also be made, by which term is meant the products obtainable by the polymerization of ethylene with one or more polymeric materials resulting from the polymerization of organic compounds of the above-mentioned types.

As many apparently widely different embodiments of this invention may be made without departing from the spirit and scope thereof, it is to be understood that I do not limit myself to the specific embodiments thereof except as defined in the appended claims.

I claim:

1. In a process for polymerizing ethylene in an aqueous medium, the steps which comprise: (1) adjusting the pH in the range of 1–6; and, (2) carrying on the polymerization at a temperature of from 20 to 350° C. and a pressure above atmospheric, and in the presence of benzoyl peroxide catalyst.

2. In a process for polymerizing ethylene in an aqueous medium, the steps which comprise: (1) adjusting the pH in the range of 1–6; and, (2) carrying on the polymerization at a temperature of 20 to 350° C., and a pressure of 50 to 3000 atmospheres, and in the presence of benzoyl peroxide catalyst.

3. In a process for polymerizing ethylene in an aqueous medium, the steps which comprise: (1) adjusting the pH in the range of 2–4; and, (2) carrying on the polymerization at a temperature of 20 to 350° C., and a pressure of 50 to 3000 atmospheres, and in the presence of benzoyl peroxide catalyst.

WILLIAM E. HANFORD.